United States Patent
Darin et al.

(10) Patent No.: US 12,485,968 B2
(45) Date of Patent: Dec. 2, 2025

(54) WHEEL DEFLECTOR

(71) Applicant: FCA US LLC, Auburn Hills, MI (US)

(72) Inventors: Eric A. Darin, Royal Oak, MI (US); Richard A Lenzen, Jr., Highland, MI (US); Dustin DeMink, Farmington Hills, MI (US); Ranjit B Pandhare, Troy, MI (US); Jeffrey M Patrias, Dearborn, MI (US); Adrian J Purvis, Lake Orion, MI (US); Prabhu L Selvaraj, Farmington Hills, MI (US); Meyyappan Valliappan, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 379 days.

(21) Appl. No.: 18/168,849

(22) Filed: Feb. 14, 2023

(65) Prior Publication Data
US 2024/0270315 A1    Aug. 15, 2024

(51) Int. Cl.
*B62D 21/15*    (2006.01)
*B60R 19/00*    (2006.01)

(52) U.S. Cl.
CPC ...... *B62D 21/152* (2013.01); *B60R 2019/002* (2013.01)

(58) Field of Classification Search
CPC .... B62D 21/15; B62D 21/152; B62D 21/155; B62D 25/08; B62D 25/085; B60R 2019/002; B60R 2021/0023
USPC ......................................... 296/187.09, 187.1
See application file for complete search history.

(56) References Cited

U.S. PATENT DOCUMENTS

| | | | |
|---|---|---|---|
| 8,985,258 B1* | 3/2015 | Midoun | B62D 21/152 180/274 |
| 9,376,073 B2* | 6/2016 | Gupta | A61M 25/02 |
| 9,415,808 B2* | 8/2016 | Onoda | B62D 27/02 |
| 10,029,732 B2* | 7/2018 | Grattan | B62D 25/082 |
| 10,093,357 B2* | 10/2018 | Buratto | B62D 21/03 |
| 10,124,831 B2 | 11/2018 | Grattan et al. | |
| 10,526,017 B2* | 1/2020 | Grattan | B62D 21/02 |
| 10,780,921 B2* | 9/2020 | Tasaka | B62D 27/02 |
| 11,247,523 B2 | 2/2022 | Hammer et al. | |
| 11,400,984 B2* | 8/2022 | Ohnaka | B62D 21/152 |
| 2015/0246692 A1* | 9/2015 | Rangaswamaiah | B62D 21/15 296/193.06 |
| 2015/0321700 A1* | 11/2015 | Onoda | B62D 21/152 296/187.09 |
| 2015/0344073 A1* | 12/2015 | Midoun | B62D 21/155 296/187.1 |
| 2021/0402940 A1 | 12/2021 | Shah et al. | |

FOREIGN PATENT DOCUMENTS

DE    102012004682 A1    9/2013

* cited by examiner

Primary Examiner — Jason S Daniels
(74) Attorney, Agent, or Firm — Jeremy J. Klobucar

(57) ABSTRACT

A vehicle that includes a vehicle frame, a wheel attached to the vehicle frame, and a wheel deflector assembly attached to the vehicle frame. The wheel deflector assembly includes a deflector plate that extends angularly outward from the vehicle frame, and the wheel deflector assembly is configured, in the event of an offset frontal impact to the vehicle that forces the wheel in a direction toward the frame, to be struck by the wheel and deflect the wheel in a direction away from the frame to prevent the wheel from travelling beneath the vehicle frame.

16 Claims, 5 Drawing Sheets

WHEEL DEFLECTOR

FIELD

The present disclosure relates to a wheel deflector.

BACKGROUND

This section provides background information related to the present disclosure which is not necessarily prior art.

In the event of a frontal offset collision with another vehicle, barrier, or some other type of object, the force of the collision may sometimes cause components of the vehicle such as the vehicle suspension and/or wheel to under-ride the vehicle and become trapped between the underbody or frame of the vehicle and the road. In such a case, the component trapped between the underbody or frame of the vehicle and the road may cause the vehicle to roll over or at least partially roll over. Vehicles having a higher ride height, a shorter wheel base, and/or a large wheels may be more susceptible to this issue.

SUMMARY

This section provides a general summary of the disclosure, and is not a comprehensive disclosure of its full scope or all of its features.

The present disclosure provides a vehicle that includes a vehicle frame, a wheel attached to the vehicle frame, and a wheel deflector assembly attached to the vehicle frame. The wheel deflector assembly includes a deflector plate that extends angularly outward from the vehicle frame, and the wheel deflector assembly is configured, in the event of an offset frontal impact to the vehicle that forces the wheel in a direction toward the frame, to be struck by the wheel and deflect the wheel in a direction away from the frame to prevent the wheel from travelling beneath the vehicle frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
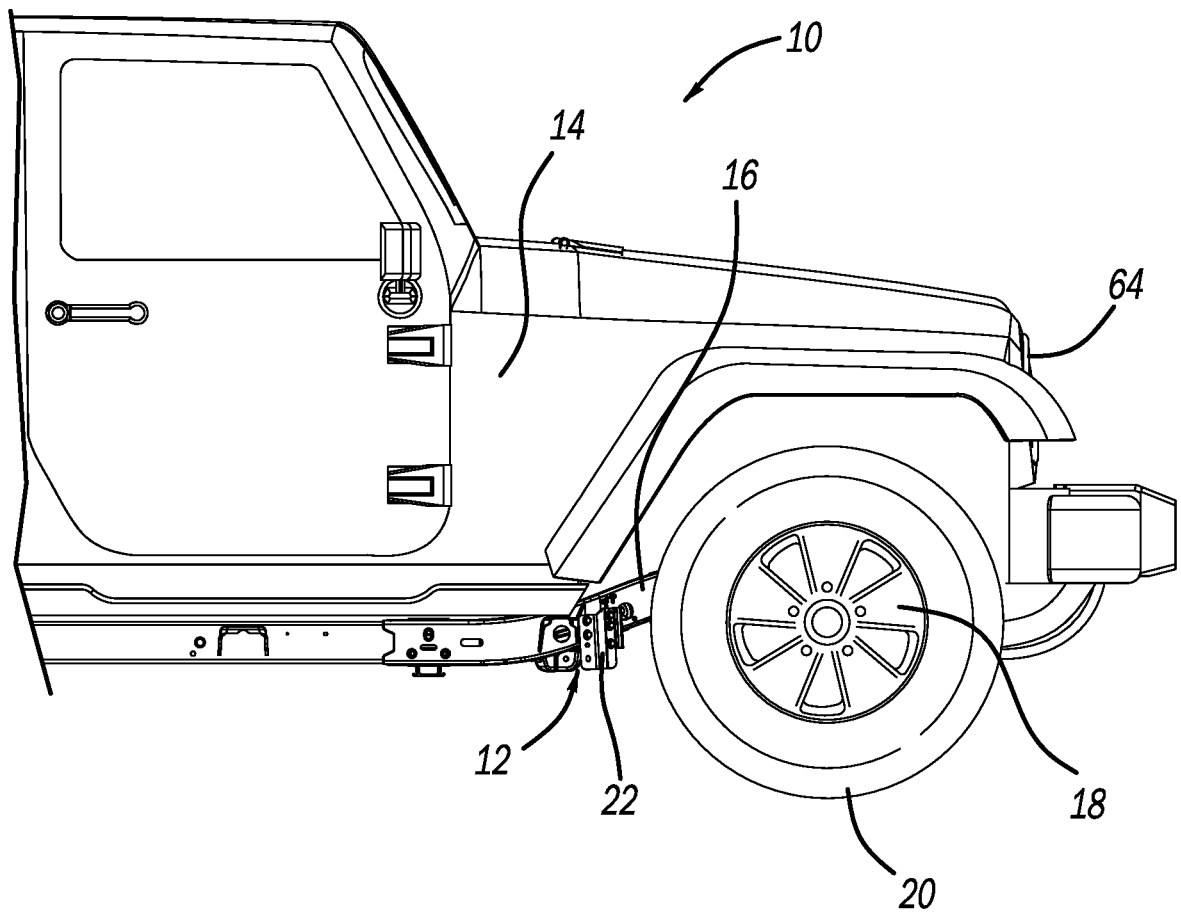
FIG. 1 is a partial side-perspective view of a vehicle having a wheel deflector assembly according to a principle of the present disclosure.

FIG. 1 illustrates a vehicle 10 having a wheel deflector assembly 12 according to a principle of the present disclosure. Vehicle 10 includes a body 14 attached to a frame 16, and a plurality of wheels 18 including tires 20 (of which only one is shown). Wheels 18 including tires 20 may be attached to the vehicle 10 in a conventional manner known by those skilled in the art.

Figure 2:
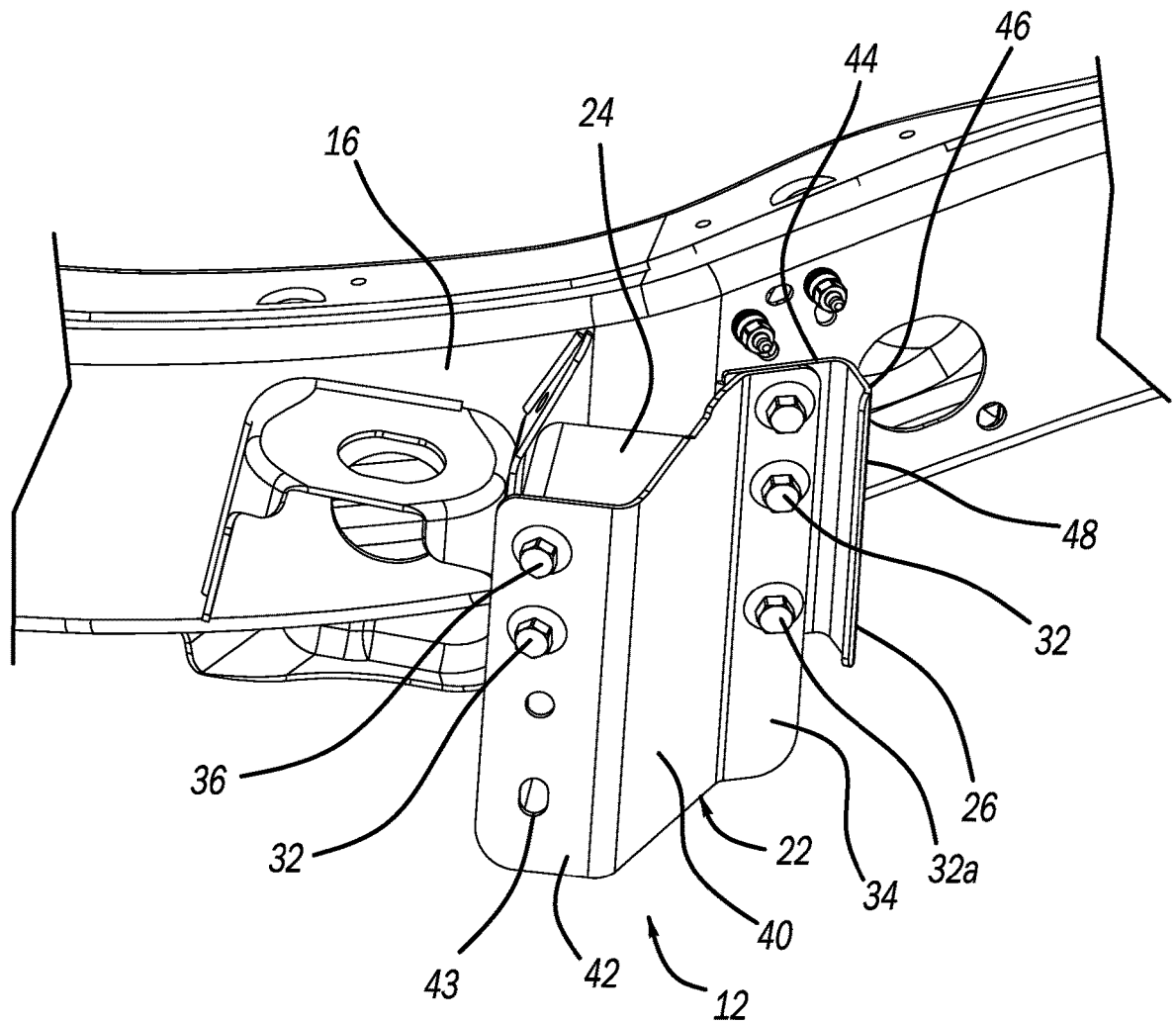
FIG. 2 is a front isometric perspective view of the wheel deflector assembly according to a principle of the present disclosure.
Figure 3:
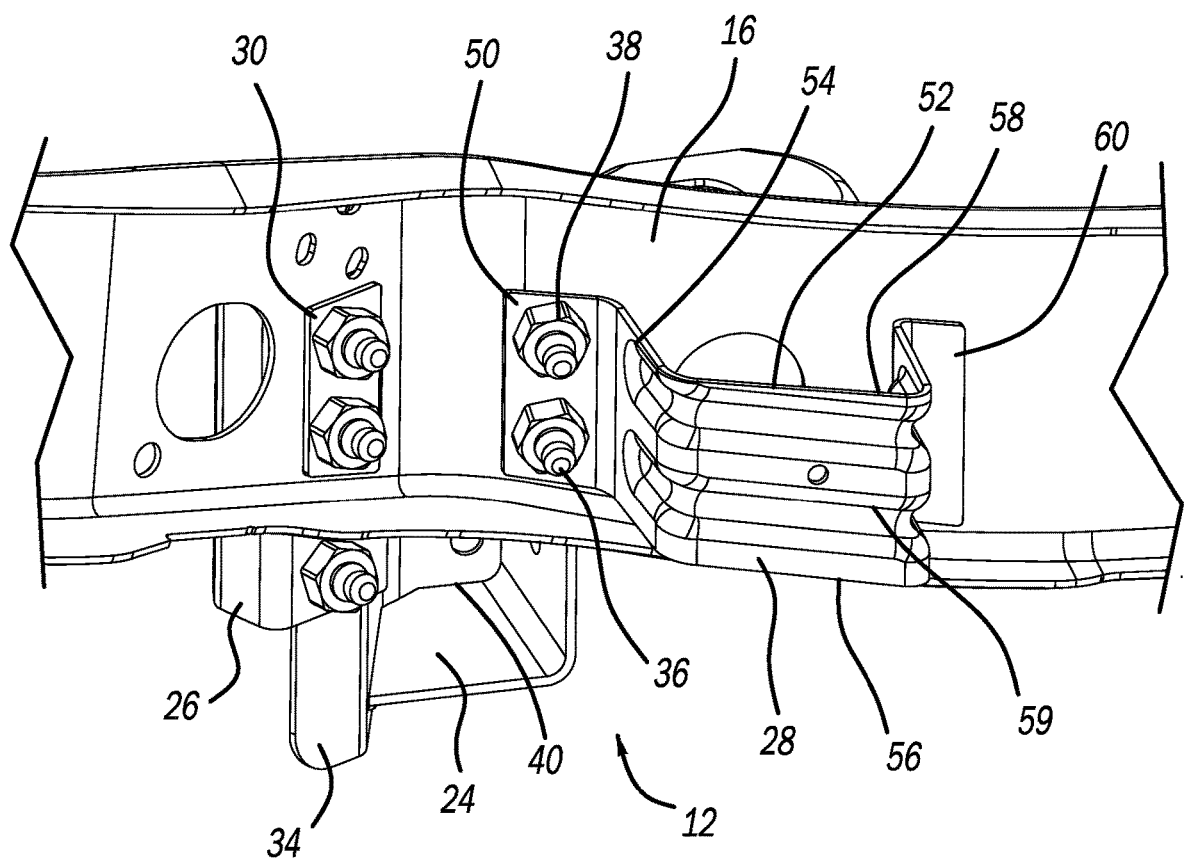
FIG. 3 is a rear isometric perspective view of the wheel deflector assembly according to a principle of the present disclosure.

Now referring to FIGS. 1 to 5, wheel deflector assembly 12 will be described in more detail. The primary components of wheel deflector assembly 12 include a deflector plate 22, a reinforcement bracket 24, a shield 26, and a bulkhead 28 (FIG. 3). Other components include a tapping plate 30 and fasteners 32 that attach the deflector plate 22, bracket 24, shield 26, and bulkhead 28 to frame 16 of the vehicle 10.

Deflector plate 22 may be formed of a rigid material such as a metal material. Example metal materials include steel, aluminum, titanium, or any other metal material or alloy known to one skilled in the art. In the illustrated embodiment, deflector plate 22 is formed of steel and includes a proximate end 34 attached to frame 16 by a plurality of the fasteners 32, which may include a threaded bolt 36 and corresponding threaded nut 38 (FIG. 3). A planar deflector panel 40 extends away from proximate end 34, which is designed to be struck by wheel 18 and/or tire 20 in the event of an offset frontal force being applied to vehicle 10. Deflector panel 40 is angled relative to proximate end 34 such that if the wheel 18 and tire 20 strike the deflector panel 40, the wheel 18 and tire 20 are deflected away from frame 16 to prevent the wheel 18 and/or tire 20 from travelling beneath frame 16 and becoming trapped. The angle at which deflector panel 40 is arranged relative to proximate end 34 may be in the range of about thirty degrees to about sixty degrees, but is variable and may be set as desired when designing vehicle 10. A distal end 42 is connected to deflector panel 40, which is similar to proximate end 34. Distal end 42 is attached to frame 16 by fasteners 32. Each of proximate end 34 and distal end 42 include apertures 43 configured for receipt of the fasteners 32.

Figure 4:
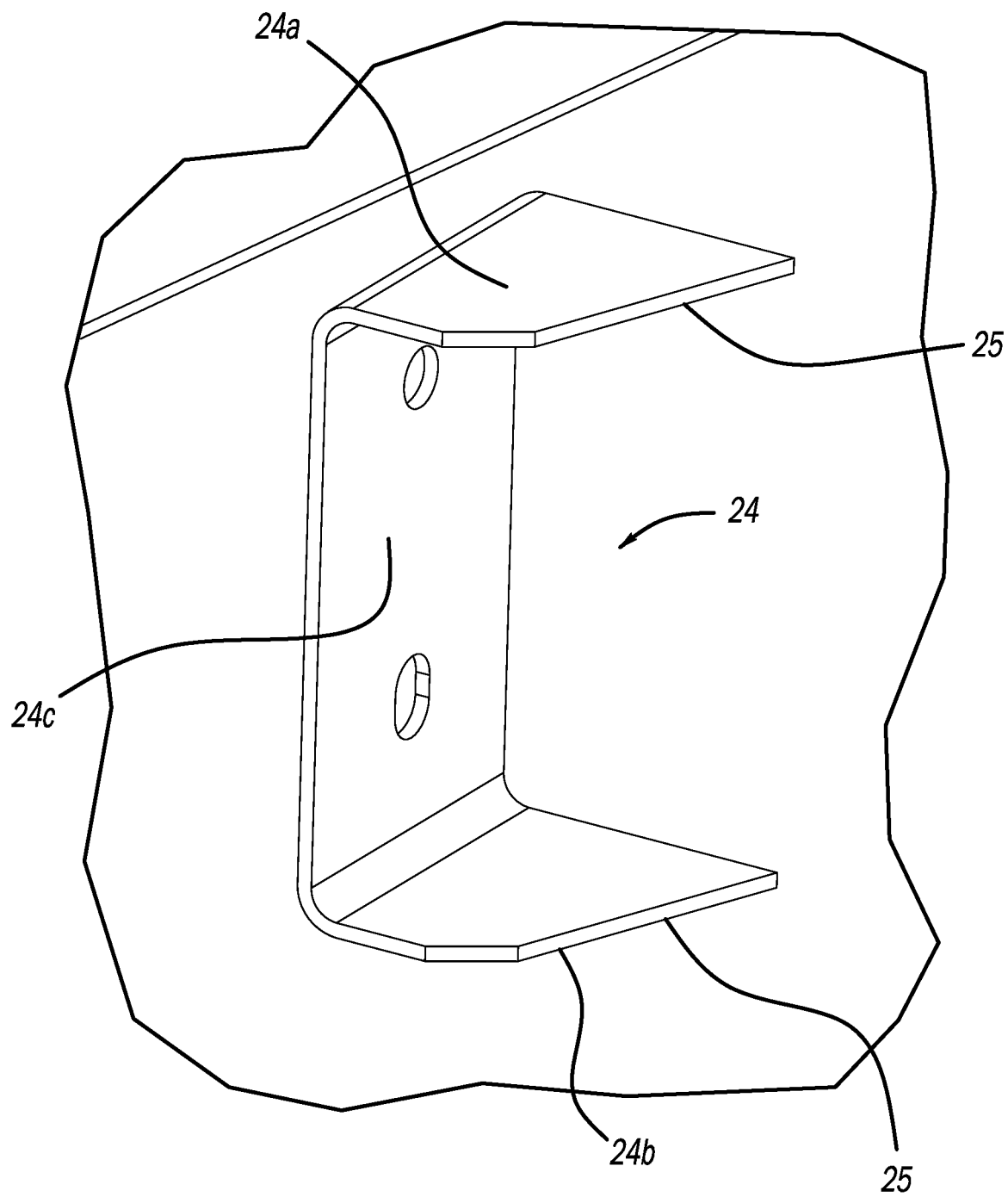
FIG. 4 is an isometric perspective view of a reinforcement bracket that is part of the wheel deflector assembly.
Figure 5:
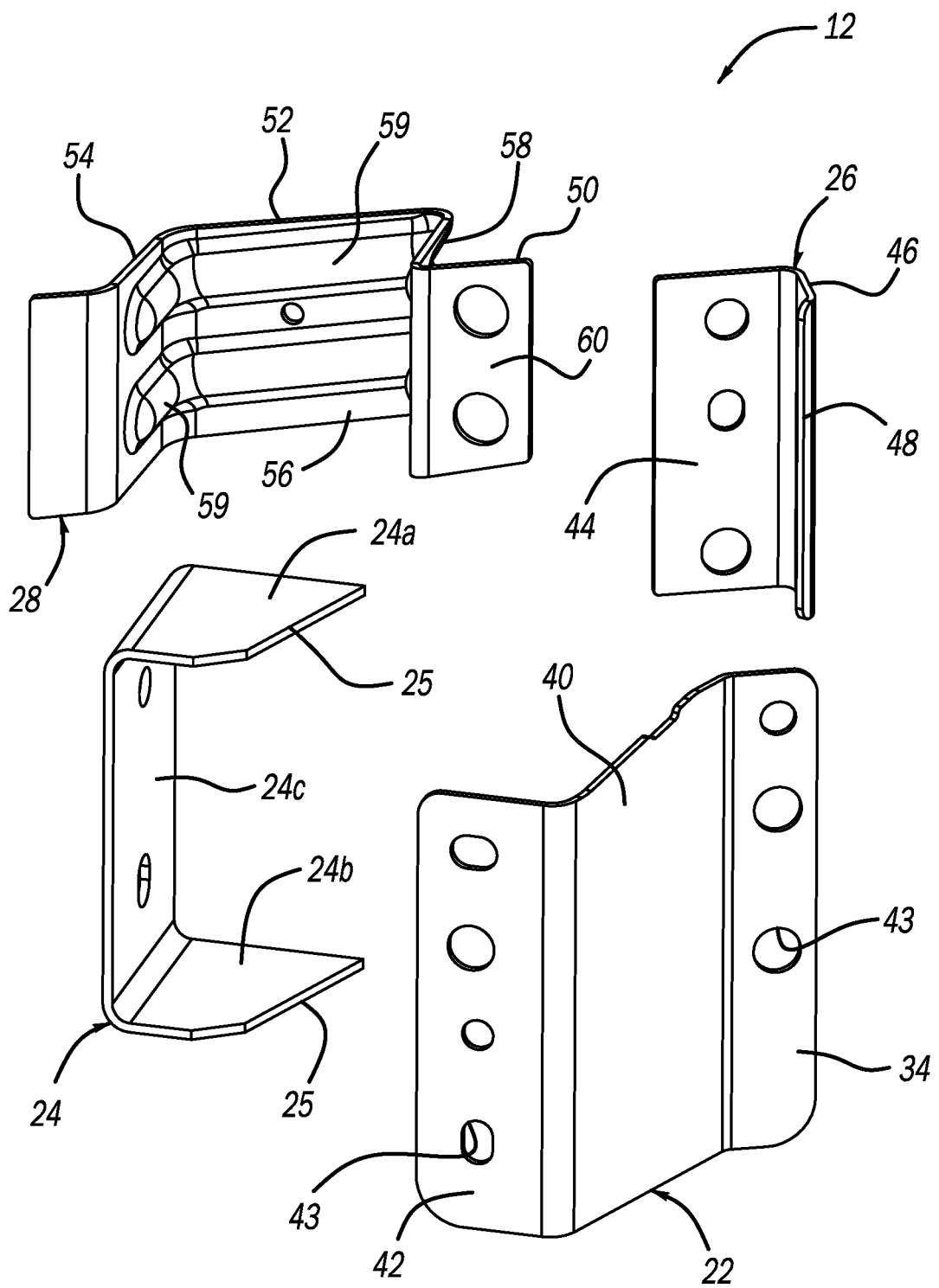
FIG. 5 is an exploded perspective view of the wheel deflector assembly according to a principle of the present disclosure.

Reinforcement bracket 24 may be formed of the same or similar material as deflector plate 22. In this regard, bracket 24 is preferably formed of a rigid metal material. As best shown in FIGS. 2 and 4, bracket 24 is a C-shaped member positioned between frame 16 and deflector plate 22, and is configured to structurally reinforce deflector plate 22 in the event that deflector plate 22 is struck by wheel 18 and/or tire 20. Bracket 24 is preferably welded to deflector plate 22 at a position that permits fasteners 32 that attach distal end 42 of deflector plate 22 to frame 16 to pass therethrough. Bracket 24 includes an upper panel 24a and a bottom panel 24b that each include an angled edge 25 that abuts deflector panel 40, and a side panel 24c that connects upper panel 24a to bottom panel 24b.

Shield 26 is positioned between frame 16 and proximate end 34 of deflector plate 22, and may be welded to frame 16. Shield 26 may be formed of the same or similar material as deflector plate 22. In this regard, shield 26 is preferably formed of a rigid metal material. Shield 26 includes an attachment plate 44 positioned between proximate end 34 of deflector plate 22 and frame 16. Attachment plate 44 is a planar member that is configured for receipt of the fasteners 32 that attach proximate end 34 of deflector plate 22 to frame 16. Shield 26 also includes an outwardly extending flange 46 that extends substantially orthogonal to attachment plate 44, wherein a distal edge 48 of flange 46 is bent in a direction toward proximate end 34 of deflector plate 22. Shield 26 is also designed to be struck by wheel 18 and/or tire 20 in the event of an offset frontal force being applied to vehicle 10, and prevent the wheel 18 and/or tire 20 from striking the fasteners 32 and potentially detaching deflector plate 22 before striking deflector panel 40. Shield 26 provides increased load capacity for wheel deflector assembly 12. In this regard, shield 26 provides for an additional fastener 32a to attach wheel deflector assembly 12 to frame 16.

Now referring to FIG. 3, it can be seen that bulkhead 28 is attached to an opposite side of frame 16 from deflector plate 22, bracket 24, and shield 26, and is offset from the combination of deflector plate 22, bracket 24, and shield 26. Bulkhead 28 is designed to provide additional structural support to frame 16 in the event of an offset frontal force being applied to vehicle 10. That is, if the force applied to vehicle 10 is to an extent that contact between the wheel 18 and/or tire 20 causes substantial damage to deflector plate 22 and bracket 24, and the wheel 18 and/or tire 20 contact frame 16, the frame 16 will be reinforced by bulkhead 28 to further assist in preventing wheel 18 and/or tire 20 from travelling under frame 16. Bulkhead 28 includes a first planar end plate 50 attached to frame 16 by fasteners 32. First planar end plate 50 may also serve as a tapping plate for fasteners 32, which are also used to secure bracket 24 to frame 16. A reinforcement panel 52 including a first section 54 extends outward from end plate 50. First section 54 extends outward from end plate 50 at an angle that may lie in the range of fifteen to twenty degrees. A second section 56 is attached to first section 54 that is designed to extend in parallel with frame 16. A third section 58 is attached to second section 56 that extends in a direction back toward frame 16. In the illustrated embodiment, third section 58 is arranged substantially orthogonal to second section 56, but the angle at which third section 58 is arranged to second section 56 is variable. Third section 58 is connected to a second planar end plate 60 that is similar to first end plate 50. First, second, and third sections 54, 56, and 58 may include structural beams 59 extending along a length thereof to provide additional strength to bulkhead 28. In the illustrated embodiment, second end plate 60 is attached to frame 16 by welding. It should be understood, however, that second end plate 60 may be attached to frame 16 using fasteners (e.g., bolts) 30 if desired.

Still referring to FIG. 3, it can be seen that tapping plate 30 is attached to frame 16 between the nuts 38 that attach the bolts 36 of the fasteners 30 to the shield 26 and deflector plate 22 positioned on the opposite side of frame 16. Tapping plate 30 is a planar member that functions in a manner similar to a washer. That is, tapping plate 30 enables nuts 38 to be more tightly secured to bolts 36 to further ensure that shield 26 and deflector plate 22 remain securely attached to frame 16.

Now operation of wheel deflector assembly 12 will be described relative to when vehicle 10 is subjected to a small overlap rigid barrier (SORB) collision test. While operation of wheel deflector assembly 12 will be described relative to a collision with a rigid barrier in a controlled environment, it should be understood that wheel deflector assembly 12 will also function in a similar manner in the event of a collision with another vehicle or some other object. When vehicle 10 collides with the barrier (not shown), the force of the impact may be to an extent that the barrier contacts the wheel 18 and/or tire 20 of the vehicle 10. Contact between the wheel 18 and/or tire 20 with the barrier may cause the wheel 18 and or tire 20 to travel in a direction back toward the vehicle frame 16. If vehicle 10 is not equipped with wheel deflector assembly 12, the wheel 18 and/or tire 20 may travel beneath frame 16 and cause the front end 64 of the vehicle 10 to lift upwards away from the ground, which is undesirable.

Wheel deflector assembly 12 assists in preventing the wheel 18 and/or tire 20 from travelling beneath frame 16. In this regard, as the wheel 18 and/or tire 20 travel in a direction back toward frame 16, the wheel 18 and/or tire will first strike wheel deflector assembly 12. Specifically, the wheel 18 and/or tire 20 may first strike shield 26 before striking deflector panel 40 of deflector plate 22, or the wheel 18 and/or tire 20 may first strike the deflector panel 40 of deflector plate 22. In either case, because deflector panel 40 extends away from frame 16 at an angle, the wheel 18 and/or tire 20 will be deflected by the deflector panel 40, which is reinforced by bracket 24 and bulkhead 28, in a direction away from frame 16 to assist in preventing the wheel 18 and/or tire 20 from travelling beneath frame 16. This deflection of the wheel 18 and/or tire 20 away from frame 16 prevents the front 64 of the vehicle 10 from lifting upwards and away from the ground, which can reduce the risk that vehicle 10 rolls over after collision with the barrier or other object.

It should be understood that wheel deflector assembly 12, while able to assist in preventing the wheel 18 and/or tire 20 from travelling in a direction toward body 14 of the vehicle (at least to an extent), is not specifically designed to assist in preventing the wheel and/or tire 20 from travelling in a direction toward the cabin of the vehicle 10. In contrast, wheel deflector assembly 12 is designed to assist in preventing the wheel 18 and/or tire 20 from travelling beneath the frame 16 and preventing a roll over incident. Thus, wheel deflector assembly 12 is designed to be attached to frame 16 in a manner that is as close to the ground beneath the vehicle 10 as possible so as to further inhibit wheel 18 and/or tire 20 from travelling beneath frame 16.

Although wheel deflector assembly 12 is designed to be as close to the ground as possible, it should be understood that wheel deflector assembly 12 (at least deflector plate 22, reinforcement bracket 24, and shield 26) may be removed from the frame 16 if the operator of the vehicle 10 desires to use vehicle 10 in an off-road recreational situation. Moreover, wheel deflector assembly 12 may be removable for repair purposes (i.e., if deflector assembly 12 is damaged in the event of a collision).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
    a vehicle frame;
    a wheel attached to the vehicle frame; and
    a wheel deflector assembly attached to the vehicle frame, wherein the wheel deflector assembly includes a deflector plate that extends angularly outward from the vehicle frame,
    the wheel deflector assembly is configured, in the event of an offset frontal impact to the vehicle that forces the wheel in a direction toward the vehicle frame, to be struck by the wheel and deflect the wheel in a direction away from the vehicle frame to prevent the wheel from travelling beneath the vehicle frame, wherein the wheel deflector assembly further comprises a shield positioned between the deflector plate and the frame, the shield configured to prevent the deflector plate from detaching from the vehicle frame when the wheel deflector assembly is struck by the wheel, and wherein the shield includes an attachment plate between the deflector plate and the vehicle frame, and a flange extending substantially orthogonally outward from the attachment plate.

2. The vehicle according to claim 1, wherein the wheel deflector assembly further comprises a reinforcement bracket positioned between the vehicle frame and the deflector plate, the reinforcement bracket configured to provide structural support to the deflector plate when the deflector plate is struck by the wheel.

3. The vehicle according to claim 2, wherein the reinforcement bracket is welded to the deflector plate.

4. The vehicle according to claim 1, wherein the deflector bracket is attached is a side of the vehicle frame that faces an exterior of the vehicle.

5. The vehicle according to claim 4, wherein the wheel deflector assembly further comprises a bulkhead attached to the vehicle frame on a side of the vehicle frame that faces an interior of the vehicle.

6. The vehicle according to claim 5, wherein the bulkhead includes a first planar end plate attached to the vehicle frame, a reinforcement panel connected to the first planar end plate and that extends in parallel with the vehicle frame, and a second planar end plate attached to the vehicle frame, wherein the reinforcement panel is spaced apart from the vehicle frame.

7. The vehicle according to claim 6, wherein the reinforcement panel includes structural members extending along a length thereof.

8. The vehicle according to claim 1, wherein the wheel deflector assembly is removable from the vehicle frame.

9. The vehicle according to claim 1, wherein the wheel deflector assembly is formed from a rigid metal material.

10. The vehicle according to claim 1, wherein the deflector plate is attached to the vehicle frame by a plurality of fasteners.

11. The vehicle according to claim 10, further comprising a tapping plate between the fasteners and the vehicle frame.

12. A vehicle comprising:
a vehicle frame;
a wheel attached to the vehicle frame; and
a wheel deflector assembly attached to the vehicle frame, wherein the wheel deflector assembly includes a deflector plate that extends angularly outward from the vehicle frame, a reinforcement bracket attached to the deflector plate between the deflector plate and the vehicle frame that is configured to reinforce the deflector plate, and a shield between deflector plate and the vehicle frame, the deflector plate is configured, in the event of an offset frontal impact to the vehicle that forces the wheel in a direction toward the vehicle frame, to be struck by the wheel and deflect the wheel in a direction away from the vehicle frame to prevent the wheel from traveling beneath the vehicle frame, and the shield is configured to be struck by the wheel before the deflector plate, the shield is configured to prevent the deflector plate from detaching from the vehicle frame when the wheel deflector assembly is struck by the wheel, and the shield includes an attachment plate between the deflector plate and the vehicle frame, and a flange extending substantially orthogonally outward from the attachment plate.

13. The vehicle according to claim 12, wherein the reinforcement bracket is welded to the deflector plate.

14. The vehicle according to claim 12, wherein the deflector plate is attached is a side of the vehicle frame that faces an exterior of the vehicle.

15. The vehicle according to claim 14, wherein the wheel deflector assembly further comprises a bulkhead attached to the vehicle frame on a side of the vehicle frame that faces an interior of the vehicle, the bulkhead including a first planar end plate attached to vehicle frame, a reinforcement panel connected to the first planar end plate and that extends in parallel with the vehicle frame, and a second planar end plate attached to the vehicle frame, wherein the reinforcement panel is spaced apart from the vehicle frame.

16. The vehicle according to claim 12, wherein the wheel deflector assembly is removable from the vehicle frame.

\* \* \* \* \*